Oct. 28, 1941.  L. F. HERLACHE  2,260,284
COIN CONTROLLED BOWLING SCOREBOARD
Filed Oct. 8, 1938   5 Sheets-Sheet 1
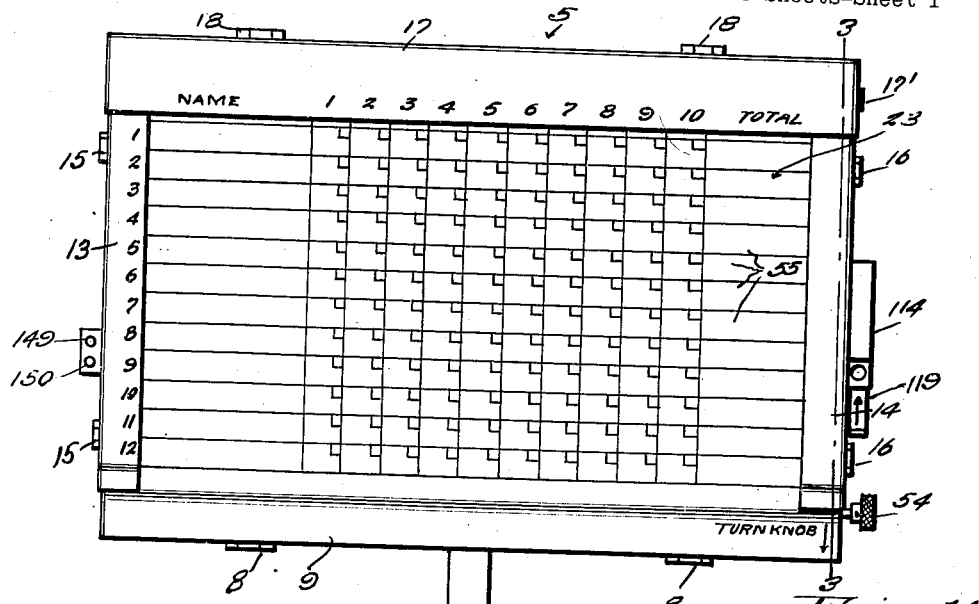
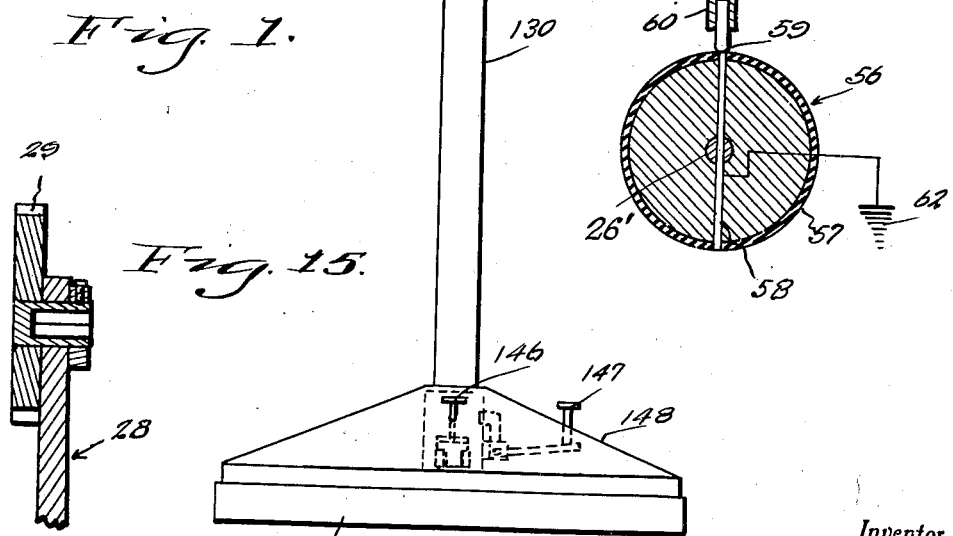
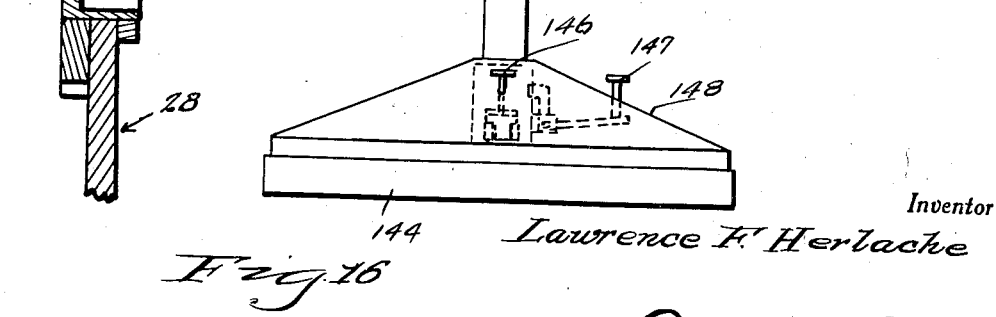
Inventor
Lawrence F. Herlache
By Clarence A. O'Brien
and Hyman Berman
Attorneys

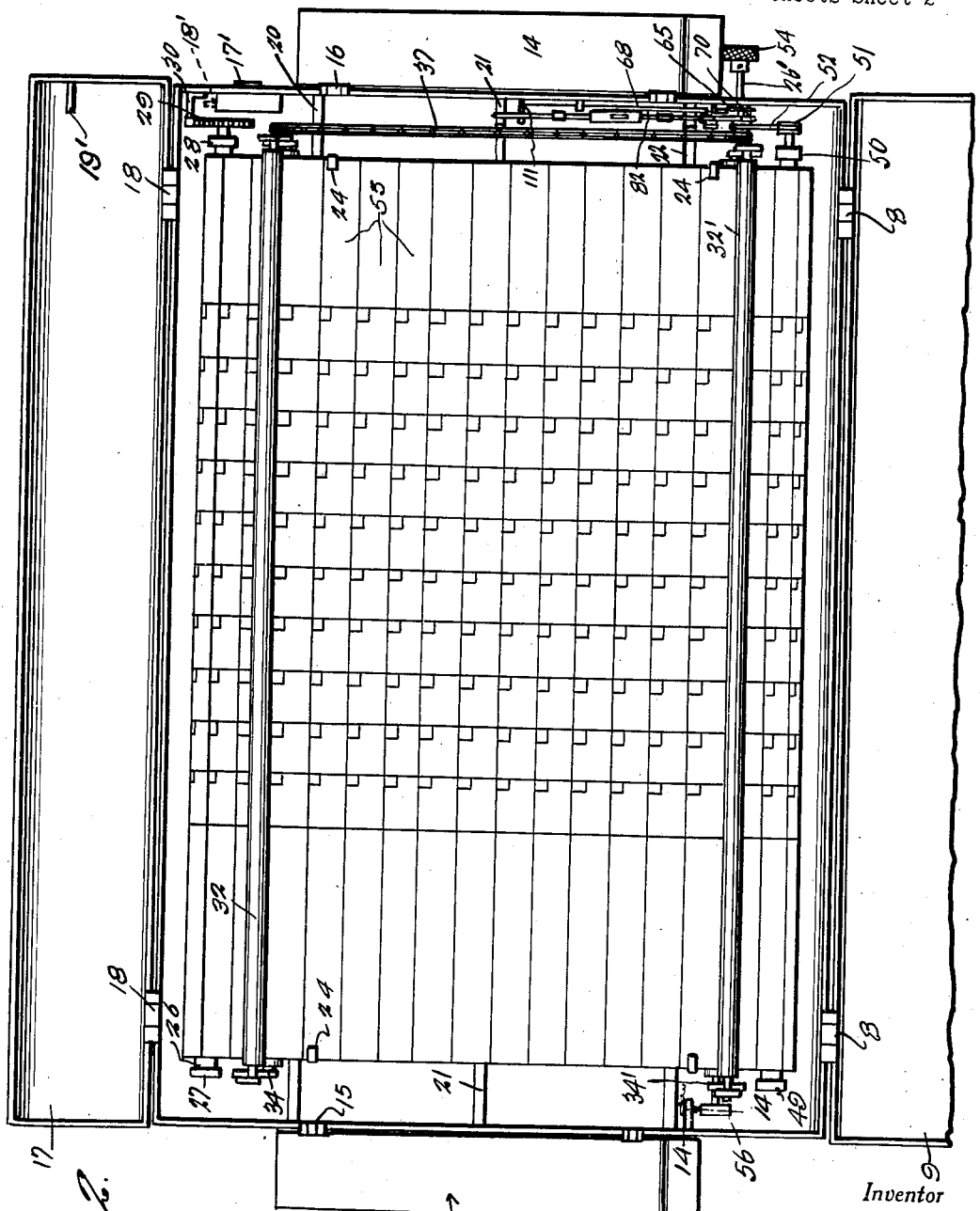

Oct. 28, 1941.   L. F. HERLACHE   2,260,284
COIN CONTROLLED BOWLING SCOREBOARD
Filed Oct. 8, 1938   5 Sheets-Sheet 3
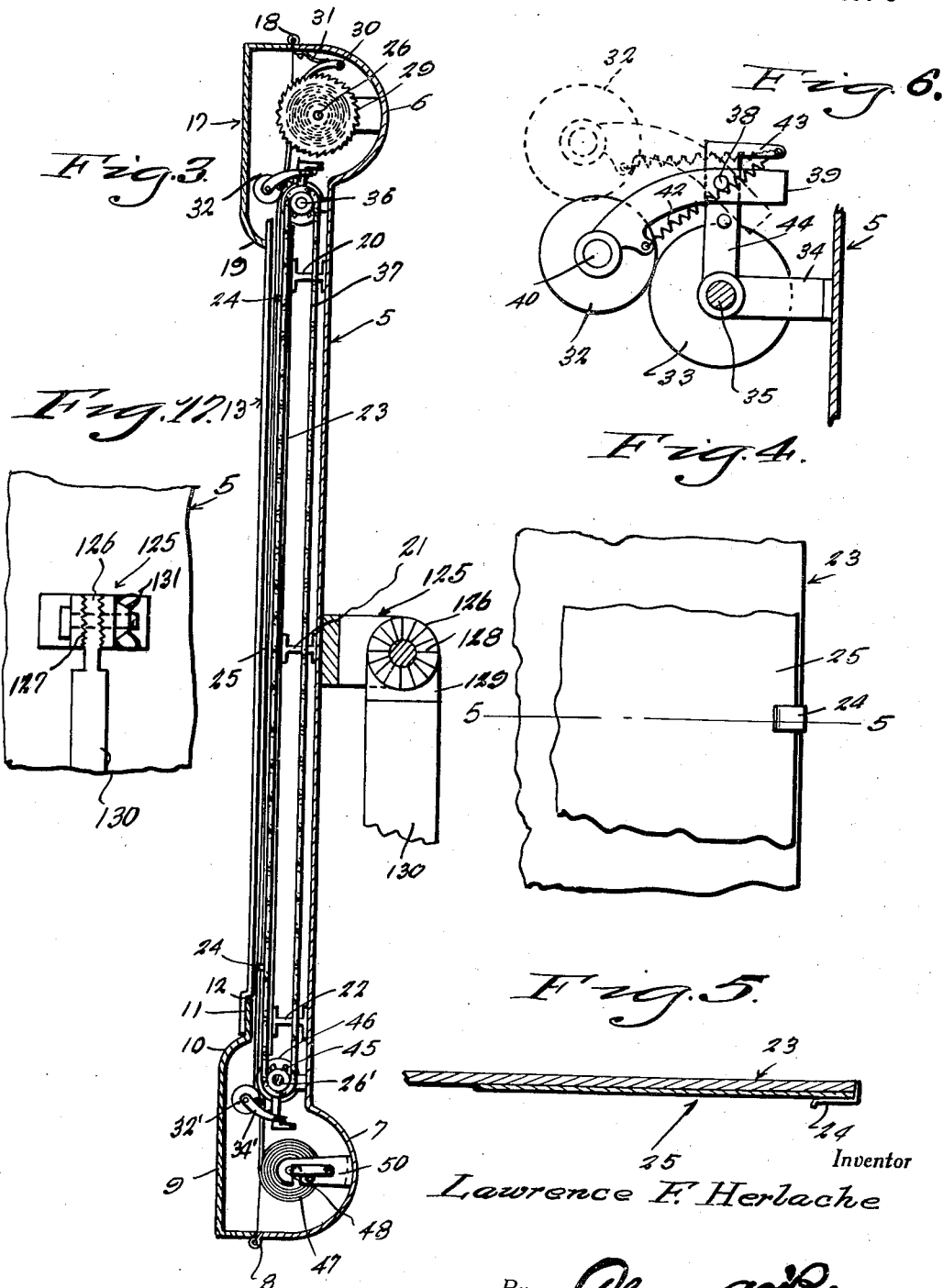
Inventor
Lawrence F. Herlache
By Clarence A. O'Brien
and Hyman Berman
Attorneys Oct. 28, 1941.   L. F. HERLACHE   2,260,284
COIN CONTROLLED BOWLING SCOREBOARD
Filed Oct. 8, 1938   5 Sheets-Sheet 4
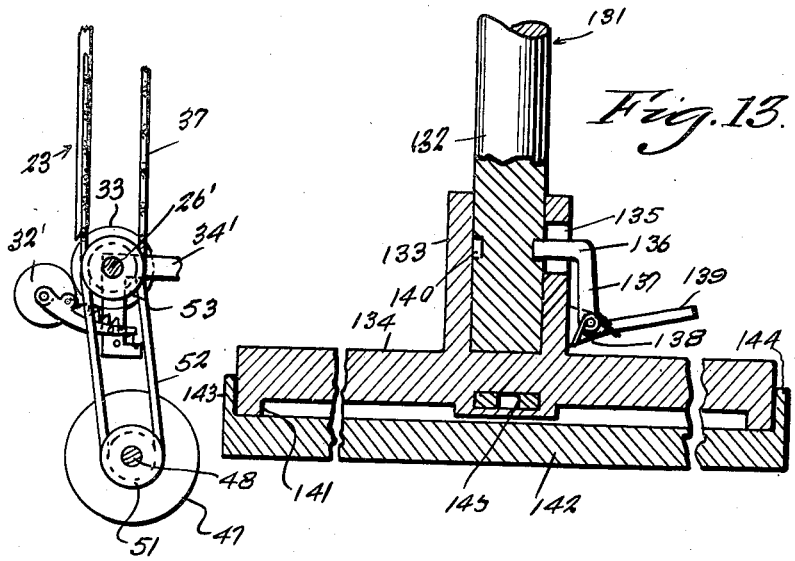
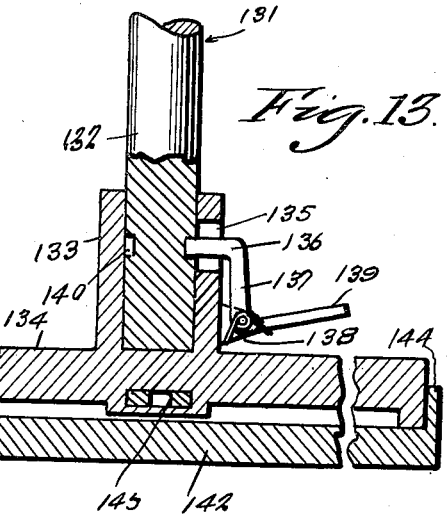
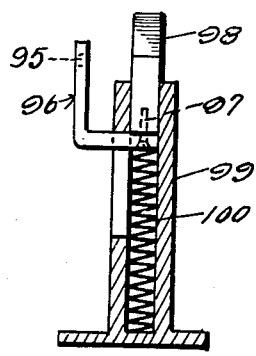
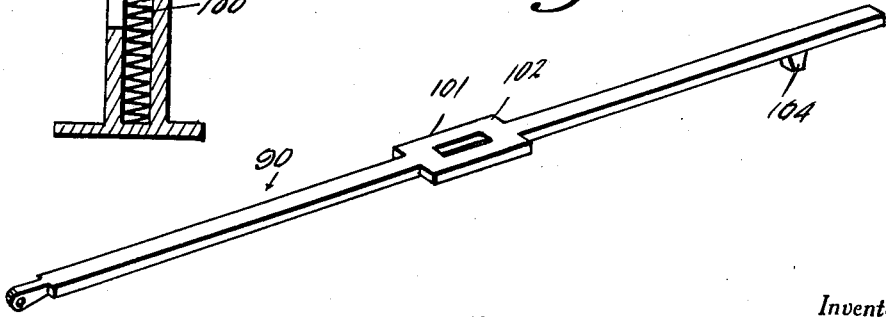
Inventor
Lawrence F. Herlache
By Clarence A. O'Brien
and Hyman Berman
Attorneys Oct. 28, 1941.  L. F. HERLACHE  2,260,284
COIN CONTROLLED BOWLING SCOREBOARD
Filed Oct. 8, 1938  5 Sheets-Sheet 5
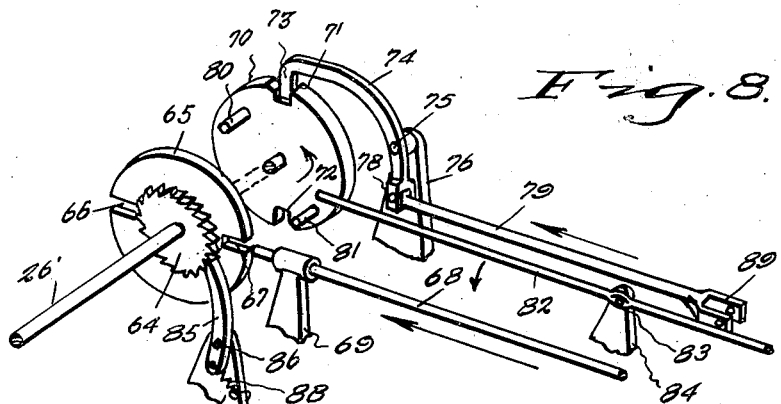
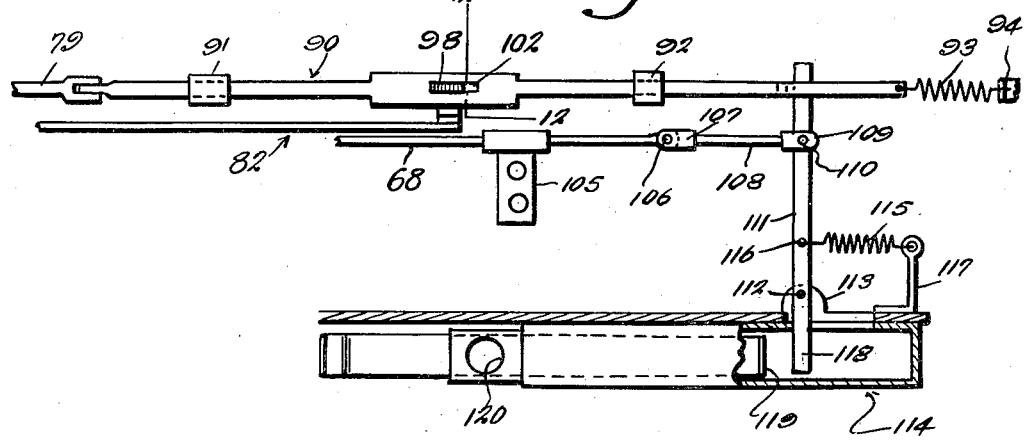
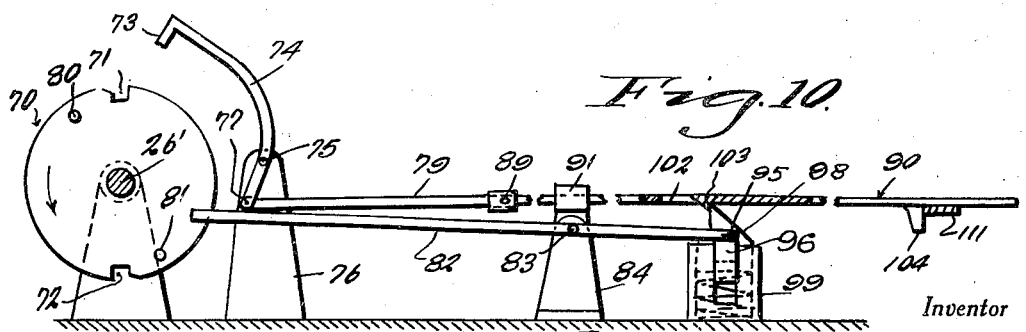
Inventor
Lawrence F. Herlache
By Clarence A. O'Brien
and Hyman Berman
Attorneys Patented Oct. 28, 1941

2,260,284

UNITED STATES PATENT OFFICE 2,260,284

COIN CONTROLLED BOWLING SCOREBOARD

Lawrence F. Herlache, Sturgeon Bay, Wis.

Application October 8, 1938, Serial No. 234,044

10 Claims. (Cl. 242—55)

My invention relates to a scoreboard for tallying the scores of bowling games, and eliminating necessity for personal supervision to prevent fraud in paying for games bowled, and involves coin-controlled means for selectively and controllably moving a shiftable tally sheet to expose space to receive the scores, and an important object of my invention is to provide a simple, efficient, and practical arrangement of this character.

Another important object of my invention is to provide in an arrangement of the character indicated above, electrical signaling means in connection with the operating mechanism whereby the pin boys working on the bowling alleys to which the scoreboard relates, can be informed of the number of players about to begin a game, the number of players being so designated by selective operation of the scoreboard to uncover and expose a corresponding number of score spaces, depending upon the number of coins deposited in the coin controlled mechanism.

Another important object of my invention is to provide in an arrangement of the character indicated above, means enabling adjusting the scoreboard rotatably on a vertical axis and transversely in a horizontal plane, relative to its base.

Another important object of my invention is to provide coin controlled operating mechanism for the selective feeding of the tally sheet, whereby overfeeding and underfeeding of the tally sheet is positively prevented, and fraudulent operation of the scoreboard eliminated.

Other important objects and advantages of my invention will be apparent from a reading of the following description taken in connection with the drawings, wherein for purposes of illustration I have shown a preferred embodiment of my invention.

In the drawings:

Figure 1 is a general front elevational view of a bowling scoreboard in accordance with the present invention.

Figure 2 is an enlarged front elevational view of the scoreboard per se showing the casing in an opened position.

Figure 3 is an enlarged transverse vertical sectional view taken through Figure 1 approximately on the line 3—3.

Figure 4 is a fragmentary front elevational view showing the tally sheet related to the table which supports the sheet for writing thereon.

Figure 5 is a longitudinal sectional view taken through Figure 4 approximately on the line 5—5.

Figure 6 is an enlarged sectional elevational view of the upper driving roller and spring-pressed idler.

Figure 7 is a fragmentary sectional elevational view of the lower paper feeding roller and idler and showing the roller operatively connected to the lower paper carrying roller.

Figure 8 is a fragmentary perspective view showing the coin controlled mechanism for determining the amount of rotation by the manually controlled paper roller turning knob, with arrows showing the direction of positive operation of the locking disc.

Figure 9 is a sectional elevational view of the coin controlled mechanism showing the operative connection between the same and the mechanism shown in Figure 8.

Figure 10 is a sectional elevational view of the mechanism shown in Figure 8, and showing this mechanism in a cocked position.

Figure 11 is a perspective view of the locking shaft.

Figure 12 is a transverse vertical sectional view taken approximately on the line 12—12 of Figure 9.

Figure 13 is an enlarged transverse vertical sectional view taken through the base and a portion of the standard of the scoreboard.

Figure 14 is an enlarged transverse vertical sectional view taken through Figure 2 approximately on the line 14—14.

Figure 15 is an enlarged transverse vertical sectional view taken through the right hand paper roll core support showing the bracket and the ratchet wheel with its hollow stub shaft for receiving a squared projection on the core.

Figure 16 is an elevational view of one of the roll cores showing the reduced projections on the opposite ends thereof, one of these being squared.

Figure 17 is an elevational view of the back of the scoreboard casing showing the adjustable hinge clamp bracket connecting the supporting pedestal thereto.

Referring in detail to the drawings, the numeral 5 generally designates a transversely elongated generally rectangular casing which has semi-cylindrical hollow projections 6 and 7 at its upper and lower ends which extend across the back thereof. Horizontally hinged as indicated by the numeral 8 to the lower edge of the portion 7 is the lower closure 9 which has an inturned portion 10 terminating in a vertical flange 11 against which fit the vertical flanges 12 on the lower ends of swingable side closures 13, 14 which are vertically hinged as indicated by the respective numerals 15, 16 to the front edges of the side walls of the casing intermediate the top and bottom of the casing, so that the member 9 is held in closed position when the side members 13 and 14 are in closed position. Holding the side members in closed position is the downwardly swingable upper closure member 17 which is hinged to the upper edge of the portion 6 as indicated by the numeral 18 and has an inturned lip 19 on its lower end which bears against the outer side of the upper part of the side members 13 and 14. A lock 17' has a bolt 18' to lockably engage a detent 19' on the member 17.

Horizontal I beam formations 20, 21 and 22 are secured to the back of the casing 5 and extend across the casing to act as supports for the table 23 which has clips 24 at its side edges to engage around the edges of the paper tally sheet 25 as indicated in Figure 4, so as to maintain the paper tally sheet in writing position relative to the table 23, as the paper is moved along relative to the table 23 and halted in place to be written upon by the scorekeeper.

An upper paper sheet roll core 26 is removably journaled in respective brackets 27 and 28 which are secured to the back of the casing, the said core being in substantial concentric relation to the semi-circular portion 6 and engaged at one end with a ratchet wheel 29, rotatably fixed to the bracket 28, with which constantly engages a ratchet pawl 30 which is pivoted on the side wall of the casing and has a spring 31 pressing the same into engagement with the ratchet wheel, all as illustrated in Figures 2 and 3. The supply of tally sheet paper is wound on the core 26 so as to feed off the front thereof and downwardly as indicated in Figure 3 in front of the table 23, first passing between the idler roller 32 and the paper feeding roller 33. An L-shaped bracket 34 mounted on the back of the casing just below the semi-cylindrical portion 6 carries the rotary shaft 35 which extends across the casing to a similar bracket and this shaft 35 has on the right hand end thereof the sprocket 36 over which the sprocket chain 37 is trained. The standard portion 44 of the bracket 34 has pivoted thereto as indicated by the numeral 38 the arm 39 to one end of which is journaled the shaft 40 which carries the idler roller 32 which extends across the casing and engages the exposed face of the tally sheet 25 and presses the tally sheet into frictional engagement with the feeding roller 33 by virtue of the presence of the spring 42 which is stretched between the free end of the arm 39 and a portion 43 of the standard portion 44 of the bracket 34, all as shown in Figure 6 of the drawings. A substantially similar arrangement at the opposite end of the idler roller from that shown in Figure 6 obtains at the opposite side of the casing.

The lower end of the sprocket chain 37 is trained over a sprocket 45 which is similar to the sprocket 36 and like the sprocket 36 is located on a shaft 26' similar to the shaft 35 and similarly mounted at both ends to the back of the casing by means of brackets 34' similar to the brackets 34, whereby the two feeding rollers 33 and 46 are operatively connected together. An idler pressing roller 32' similar in all respects to the pressing roller 32 already described is disposed relative to the feeding roller 46, and a support of the presser roller 32' is similar in all respects to that described in connection with the idler pressure roller 32 except that the arrangement shown in Figure 6 is inverted.

The paper tally sheet 25 feeds down beyond the rollers 32' and 46 and is taken on the lower receiving roller 47 which is mounted on a core 48 having its ends removably journaled in appropriate brackets 49 and 50 mounted in the lower semi-cylindrical section 7 of the casing all as shown in Figures 2 and 3 of the drawings.

The cores 26 and 48 are made removable to enable inserting a new roll of paper at the top of the casing when the roll in place is exhausted and all wound onto the lower core. The wound lower core is removed and replaced by the empty upper core. The free end of the new roll on the upper core is brought down and clipped to the lower empty core.

As shown in Figure 7 of the drawings the shaft 48 has thereon a pulley 51 over which is trained a belt 52 which is also trained over a pulley 53 fixed on the shaft 26'. This belt 52 is loosely trained over these pulleys so as to afford a certain amount of slippage when the amount of paper rolled on the core 48 so increases the diameter of the roller as to otherwise cause unwanted faster and larger feeding of the paper by the turning of the manually operated knob after the coin controlled mechanism has been operated, for the purpose of exposing an appropriate number of spaces to receive the scores of players about to begin a game; thereby allowing the parts to work in such a manner as to retain the same relative amount of feeding of the paper as obtains when the receiving roll 47 has only a moderate amount of paper wound thereon. The core has a squared end which connectibly enters a similar opening in the pulley 51, in a manner similar to the connection of the upper core with the ratchet wheel 29, the opposite ends of these cores turning freely in the brackets provided.

The operating knob 54 which is exposed at the right hand side of the casing as indicated in Figure 2 of the drawings is mounted on an extension of the shaft 26' which has the pulley 53 thereon, so that when the coin controlled mechanism has been properly operated to the released position, turning of the knob 54 in the paper feeding direction will coordinately rotate the frictional feeding rollers 46 and 33, and thereby feed the paper downwardly from the supply roll to the receiving roll 47. The arrangement is such that each time a coin of the proper denomination is utilized in the coin controlled mechanism and the coin controlled mechanism operated, the knob 54 can be turned only a certain distance, namely one-half revolution, so that no more and no less than one full score space 55 on the paper 25 is brought into view below the lower edge 19 of the upper casing portion 17. Where it is desired to expose more than one of the score receiving spaces 55, the appropriate number of coins is utilized individually for individual operations of the coin controlled mechanism accompanied by turnings of the knob 54 until the desired number of such spaces has been exposed below the edge 19.

The left hand end of the shaft 26' is connected to a rotor 56, as shown in Figure 14 whose periphery is covered by insulating material 57 and which is traversed diametrically by a conductive material element 58 whose opposite ends are exposed through the insulating material 57 for engagement by the spring-pressed contact 59 which is mounted in a bushing 60 secured on an insulated bracket 61 projecting from the adjacent side wall of the casing as shown in Figure 2, the contact member 58 being grounded as indicated by the numeral 62 while a wire 63 leads from the bushing 60 to a warning device such as a lamp on the pin setting machine or in the alley pit, whereby the pin boy or boys are given immediate notice automatically upon bringing the desired number of scoring spaces into view, that a corresponding number of persons is about to bowl. The tally light is operated by the coin operation of the device once for each coin deposit so as to enable the pin boy called to check on the number of persons who have paid to bowl on his alley. To call the pin boy from the pin boys' lounge, the call spotter button 149 is pushed thereby sounding a call and indicating the number of the alley calling. The call manager button 150 is only used in an emergency, as when the pin boy fails to duly appear after operation of the call spotter button.

The coin controlled mechanism and associated mechanism is located at the right hand side of the casing and mounted on the back of the casing as well as on the support members 21 and 22 and the longitudinally operating parts work in vertical planes and in a vertical position as clearly shown in Figure 2 of the drawings. The arrangement and operation and construction of this mechanism is shown in Figures 8, 9 and 10 wherein it is shown that on the extension of the shaft 26' on which the knob 54 is fastened is secured the ratchet wheel 64 alongside of the secondary locking disk 65. The disk 65 is provided at diametrically opposite points with radial slots 66 and 67 designed to receive the end of the locking rod 68 which is slidably mounted in a bracket 69. To the right of the disk 65 is the primary locking disk 70 which is fixed to the shaft 26' with its diametrically opposed peripheral radial slots 71 and 72 spaced at 90° of rotation from the slots of the disk 65 and arranged to be engaged at certain stages of operation by the dog 73 on the end of the pawl 74 which is pivoted as indicated by the numeral 75 on the bracket 76 and has a clevis 77 on its end opposite the dog 73 in which is pivoted as indicated by the numeral 78 one end of the connecting rod 79. In addition there projects from the right hand side of the disk 70 diametrically opposed lateral fingers 80, 81 which are adapted in the rotation of the primary disk 70 in the direction indicated by the arrow to alternately engage the tiltable releasing rod 82 which is pivoted intermediate its ends as indicated by the numeral 83 on the supporting bracket 84. A ratchet pawl 85 is pivoted as indicated by the numeral 86 on a bracket support 87 and pulled into engagement with the ratchet 64 by a suitably arranged spring 88.

The upper and clevis equipped end 89 of the connecting rod 79 is connected as indicated in Figure 9 to the lower end of the locking slide which is generally designated 90 and which is mounted in slide brackets 91 and 92 and has attached to its upper end a retracting spring 93 which is stretched between the said upper end and a stationary bracket 94. The upper end of the rod 82 is pivoted as indicated by the numeral 95 to the upper end of the L-shaped arm 96 which is secured as indicated by the numeral 97 to the lower end of the latch bolt 98 which is vertically slidably mounted in the support 99 which encloses an expanding spring 100, the support 99 being secured to the back of the casing in a position under the laterally enlarged portion 101 of the locking shaft 90 as indicated in Figures 9 and 10 of the drawings. The enlarged portion 101 has a longitudinally elongated slot 102 into which the latch 98 is adapted to project as indicated in Figure 9 of the drawings in a certain position of operation of the parts. A stop 103 adjacent the upper end of the slot 102 is also adapted to be engaged by the latch 98 in another position of the parts for the purpose of holding the shaft 90 in a downward position against the tension of the spring 93. The upper end of the shaft 90 has another stop 104 on the back thereof the function of which will be described herein.

The upper end of the primary locking shaft 68 passes through a slide bracket 105 and pivotally connects as indicated by the numeral 106 with a clevis 107 on a connecting rod 108 which has a clevis 109 on its upper end pivoted as indicated by the numeral 110 to an intermediate portion of the coin slide operated lever 111 which is supportably pivoted as indicated by the numeral 112 on a projection 113 on the side of the coin slide casing 114. A retracting spring 115 is stretched between the point 116 on the lever 111 and a bracket 117 fastened to the upper part of the coin slide casing, all as shown in Figure 9 of the drawings. The inner end 118 of the lever 111 extends within the coin slide casing 114 for operative engagement by the coin slide 119 when the coin slide is pushed upwardly in operating the same after insertion of a proper coin in the receiver 120, the coin slide casing being mounted on the outer side of the right hand side wall of the scoreboard casing 5 as illustrated in Figure 1 of the drawings.

When the prospective bowler inserts proper coins in the slots and presses coin slide 119 ahead, the free end of the lever 111 is caused to bear against the stop 104 on the locking slide 90, and pushes this slide in a left hand direction, to constitute an activity called "cocking." As the locking slide 90 moves in the direction stated, the stop 103, attached thereto, bears against the inclined face of the latch 98, and causes the latch to be depressed within its support 99 and against the tension of its expanding spring 100. When the slide 90 is pushed in the left hand direction such distance as to cause the stop 103 to have completely passed over the latch 98, the latch arises, thru its expanding spring 100, to a position behind the stop 103, and, thereby, to fix the locking slide 90 in this cocked position, all of which is apparent in Figure 10.

Simultaneous with this activity, the action of slide 90 works the connecting rod 79 so as to withdraw pawl 74 from the notch 71 of the primary locking disc 70. Now the disc 70 is free to be turned in the direction indicated by the operating knob 54 which is connected with this disc by the continuous shaft 26'. Immediately or very soon after the turning of the operating knob 54 is begun, the lateral finger 81 on the disc 70 will strike the adjacent end of the latch releasing lever 82, and correspondingly depress the opposite end of the lever 82 so as to withdraw the latch 98 from behind the stop 103, the movement of the lever 82 being great enough to insure complete withdrawal of the latch 98 from the stop 103 without failure. The latch 98 being withdrawn from the stop 103, the slide 90 is free to be retracted in a right hand direction by its spring 93, and pulls the pawl 74 down so as to engage the boss 73 with the periphery of the disc 70. Referring to the location of the lateral finger 81 and the adjacent end of the latch releasing lever 82, Figures 8 and 10, it is evident that the boss 73 will be brought into engagement with the periphery of the primary locking disc 70 before this disc has made much more than a quarter turn. Thus, the boss 73 will ride on the periphery of the disc 70 until it falls into the notch 72. The notches 71 and 72 have one edge beveled while the other is straight and radial. The bevel feeds the dog 73 part way into one side of the slots then constitutes an abutment for the dog even before the dog actually falls into the slot. This arrangement insures against fraudulent operation by a quick turn of the operating knob 54 in an endeavor to cause the boss to skip over the notch, and thereby, expose more than the legitimate one scoring space.

Simultaneous with the left hand movement or cocking of the slide 90, as described above, the lock rod 68, which is attached to the lever 111, is likewise moved in the same direction so that its left hand extremity enters the radial slot 66 or 67 of the secondary locking device 65. While in the radial slot it locks the operating knob 54 against turning. The lock rod 68 will be withdrawn, and consequently the lock released, only when the coin slide 119 is withdrawn so as to permit the lever 111 to be retracted by its spring 115 and thereby withdraw the rod 68. The importance of this secondary locking mechanism will be seen in the following example:

Suppose the operator inserted coins and pushed in the coin slide 119 just far enough to move slide 90 to a position whereby it had raised boss 73 of pawl 74 just clear of the notch 71, and yet not quite far enough to cause the latch 98 to arise behind the stop 103. As shown in Figure 10, the pawl 74 is raised higher than just enough to cause the boss 73 to be cleared of the notch 71 in the normal operation of the mechanism. It would not be desirable to have the activity of pawl 74 and latch 98 so closely timed that the instant the pawl frees the disc 70 the latch would catch behind the stop 103. It would be almost impossible to have such a coordination and have efficiency. Therefore, it is desirable to have the boss 73 withdrawn from the notch 71, followed by the arising of the latch 98, behind the stop 103. The result of such a circumstance would be that the latch 98 would not be brought into play with the result that the normal operation of the mechanism would be disrupted, and the operating knob 54 would be free to be turned as much as desired, just as long as the operator held the coin slide 119 in this position. But, with the engagement of the secondary locking mechanism, such a fraudulent operation is not possible, because not until the coin slide 119 is released by the operator, with the consequent retraction of lever 111 and withdrawal of lock rod 68 from the radial slot 67, is the operating knob 54 free to be turned. Thus, this can be accomplished only when the slide 90 is fully cocked and the normal operation of the mechanism assured.

The scoreboard casing 5 has on the middle of its back a bracket 125 which has a cylindrical portion 126 which has a serrated face 127 with which is adapted to engage a serrated face 128 on a similarly formed projection 129 on the upper end of the standard 130, and a wing nut equipped bolt 131 traverses the portion 126 and the portion 129, whereby the angle of the casing 5 with respect to the standard 130 may be adjusted on the axis of the bolt 131 and locked in position, whereby the casing 5 is rigidly supported in the desired angulated position. The lower end of the standard 130 is cylindrical as indicated by the numeral 132 and disposed in a socket 133 rising from a slide plate 134, which socket has therein an opening 135 through which projects the lug 136 on a spring-pressed detent 137 which is mounted on a bracket 138 and is equipped with a foot operated lever 139 for withdrawing the lug 136 into and out of engagement with the selected one of the depressions 140 which are circumferentially spaced on the part 132 of the standard 130, this arrangement being provided to enable rotating the standard to a desired position of adjustment and locking the same therein.

The slide plate 134 has runners 141 adjacent its opposite edges which slide upon the top of the base 142 which has retaining flanges 143 and 144. Locking means 145 similar in principle to the locking means already described is operated by a foot pedal 146. The first described locking means being operated by a foot pedal 147, both foot pedals projecting through a canopy 148 which surrounds the standard and covers the mechanism and the slide plate as shown in Figures 1 and 13 of the drawings, whereby the scoreboard may be adjusted longitudinally or transversely of the base 142 and locked in the selected position.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

Having described the invention, what is claimed as new is:

1. A scoreboard comprising a casing, a replaceable paper containing upper core in the upper part of the casing, a replaceable lower paper receiving core in the lower part of said casing, a roll of paper on the upper core and feeding downwardly onto said lower core and marked horizontally into score spaces, a vertical plate supported in the casing behind the paper and extending between the said cores and facilitating writing on the paper, means defining an opening in the front of said casing and exposing a major portion of the paper between the cores, said means having a horizontal edge at the upper part of the casing relative to which the paper is moved downwardly, upper and lower sets of spring pressed friction rollers adjacent the upper and lower cores, said friction rollers engaging opposite sides of the paper extending between the cores, coordinating means operatively connecting a certain one of each set of friction rollers to turn together the same amount, and manual means exposed at the side of the casing and operatively connected with said coordinating means and with one of said cores.

2. A scoreboard comprising a casing, a replaceable paper containing upper core in the upper part of the casing, a lower paper receiving core in the lower part of said casing, a roll of paper on the upper core and feeding downwardly onto said lower core and marked horizontally into score spaces, a vertical plate supported in the casing behind the paper and extending between the said cores and facilitating writing on the paper, means defining an opening in the front of said casing and exposing a major portion of the paper between the cores, said means having a horizontal edge at the upper part of the casing relative to which the paper is moved downwardly, upper and lower sets of spring pressed friction rollers adjacent the upper and lower cores, said friction rollers engaging opposite sides of the paper extending between the cores, coordinating means operatively connecting a certain one of each set of friction rollers to turn together the same amount, and manual means exposed at the side of the casing and operatively connected with said coordinating means and with one of said cores, the last-mentioned core comprising said paper receiving roller.

3. A scoreboard comprising a casing, a paper containing upper core in the upper part of the casing, a lower paper receiving core in the lower part of said casing, a strip of paper feeding downwardly off said upper core onto said lower core, means defining an opening in the front of said casing exposing the said strip of paper, said means comprising an upwardly swingable lower closure concealing the lower core, laterally inwardly swingable side closures arranged to overlap the lower closure, a downwardly swingable upper closure arranged to overlap the side closures and conceal the upper core, and locking means operating between the casing and said upper closure.

4. A scoreboard comprising a casing, a paper containing upper core in the upper part of the casing, a lower paper receiving core in the lower part of said casing, a roll of paper on said upper core feeding downwardly onto said lower core and marked horizontally into score spaces, means defining an opening in the front of said casing exposing the paper between the cores, said means having a horizontal edge at the upper part of the casing relative to which the paper is moved downwardly a predetermined number of score spaces at a time, and manual means at the side of the casing and operatively connected with one of the cores, an electrical contact on a side of said casing adjacent the last mentioned core, a contact rotor on the last-mentioned core engaged by said contact, said contact rotor having circumferentially spaced conductive areas insulated from each other, for making and breaking an electric signal circuit as each of the score spaces is exposed below said horizontal edge by rotation of the cores by said manual means.

5. A scoreboard comprising a rotatable core, paper wound on said core, means for rotating said core, said means including a rotary shaft, coin controlled means normally engaging parts on said shaft and preventing rotation thereof, said parts on the shaft including a ratchet wheel, a primary locking disk and a secondary locking disk, and said coin controlled means comprising a ratchet pawl engaged with the ratchet wheel, movable elements engageable with notches in the peripheries of the disks, and a latch releasing tiltable lever, one of the disks having pegs for engaging and tilting the tiltable lever, a swingably supported lever, operatively engageable with both of said movable elements, and a coin slide operatively engageable with said lever.

6. A scoreboard comprising a casing, upper and lower cores in the upper and lower parts of said casing, a roll of paper on the upper core feeding downwardly onto the lower core, a vertical plate supported between the upper and lower cores and against the back of the paper extending between the cores whereby writing on the paper is facilitated, means defining an opening in front of the casing exposing the paper between the cores, upper and lower sets of friction rollers, each set comprising a pair of friction rollers engaging opposite sides of the paper adjacent said upper and lower cores, coordinating means operatively connecting the upper set of friction rollers with the lower set of friction rollers to turn together the same amount, manual means operatively connected with said coordinating means and with said lower core for winding the paper on said lower core as the paper is fed off the roll on the upper core.

7. A scoreboard according to claim 6 wherein said manual means comprises a rotary element, and coin controlled means operatively connected to said rotary element, said coin controlled means normally preventing operation of said rotary element, said coin controlled means being operable upon insertion of a coin therein to permit limited rotation of said rotary element, for moving the paper a predetermined amount downwardly across the front of said vertical plate.

8. A scoreboard according to claim 6 wherein coin controlled means connected with said manual means normally locks said manual means against operation.

9. A scoreboard comprising a vertical casing, horizontal rotatable upper and lower cores mounted in the upper and lower parts of the casing, a roll of paper on the upper core and brought downwardly and wound on said lower core, means preventing reverse rotation of said upper core, an upper pair of friction rollers located subjacent to said upper core, a lower pair of friction rollers located near the lower roller, said pairs of friction rollers each comprising a rear relatively stationary roller bearing against the back of the paper extending between the upper and lower cores, said rear rollers projecting forwardly of the cores and of the paper rolled thereon, said pairs of friction rollers further comprising a rearwardly spring pressed movably supported front roller bearing against the front side of the paper between the cores in opposition to the rear stationary rollers, said rear rollers having sprockets thereon, a sprocket chain trained over the sprockets, a manually rotatable element for rotating the rear stationary roller of the lower pair of friction rollers, first means operatively connecting the last mentioned rear stationary roller and said manually rotatable element, and second means operatively connecting said last mentioned rear stationary roller and the lower rotatable core.

10. A scoreboard according to claim 9 wherein coin controlled means is effectively connected with said first means for preventing rotation of said first means by said manually operable element while said coin controlled means is in an inoperative position.

LAWRENCE F. HERLACHE.